(12) United States Patent
Wu et al.

(10) Patent No.: US 11,658,720 B2
(45) Date of Patent: *May 23, 2023

(54) INDICATING A BEAM SWITCH REQUEST (71) Applicant: Motorola Mobility LLC, Chicago, IL (US)

(72) Inventors: Lianhai Wu, Beijing (CN); Chenxi Zhu, Fairfax, VA (US); Haipeng Lei, Beijing (CN); Zhuoyun Zhang, Beijing (CN); Hongchao Li, Beijing (CN)

(73) Assignee: Motorola Mobility LLC, Chicago, IL (US)

( * ) Notice: Subject to any disclaimer, the term of this patent is extended or adjusted under 35 U.S.C. 154(b) by 36 days.

This patent is subject to a terminal disclaimer.

(21) Appl. No.: 17/205,969

(22) Filed: Mar. 18, 2021

(65) Prior Publication Data

US 2021/0211179 A1 Jul. 8, 2021

Related U.S. Application Data (63) Continuation of application No. 16/611,130, filed as application No. PCT/CN2017/083233 on May 5, 2017, now Pat. No. 10,992,367.

(51) Int. Cl.
*H04B 7/06* (2006.01)
*H04W 36/00* (2009.01)
*H04W 24/10* (2009.01)
*H04W 36/08* (2009.01)
*H04W 72/044* (2023.01)

(52) U.S. Cl.
CPC .......... *H04B 7/0695* (2013.01); *H04W 24/10* (2013.01); *H04W 36/00837* (2018.08); *H04W 36/08* (2013.01); *H04W 72/046* (2013.01)

(58) Field of Classification Search
CPC ...... H04B 7/063; H04B 7/0695; H04B 7/088; H04W 36/08; H04W 36/00837; H04W 24/10; H04W 72/046
See application file for complete search history.

(56) References Cited

U.S. PATENT DOCUMENTS

| 2016/0007261 | A1 | 1/2016 | Oh et al. |
| 2016/0183234 | A1 | 6/2016 | Sung et al. |
| 2016/0337916 | A1 | 11/2016 | Deenoo et al. |

(Continued)

FOREIGN PATENT DOCUMENTS

| CN | 106374984 A | | 2/2017 | |
| CN | 108632007 A | * | 10/2018 | ........... H04L 5/0053 |
| EP | 3879881 A1 | * | 9/2021 | ........... H04B 7/0617 |

OTHER PUBLICATIONS

PCT/CN2017/083233, Notification of Transmittal of the International Search Report and the Written Opinion of the International Searching Authority, or the Declaration, Jan. 25, 2018, pp. 1-10.

*Primary Examiner* — Chi H Pham
*Assistant Examiner* — Vladislav Y Agureyev
(74) *Attorney, Agent, or Firm* — Kunzler Bean & Adamson (57) ABSTRACT

Apparatuses, methods, and systems are disclosed for beam switching. One apparatus includes a transmitter transmits information indicating a beam switch request, measurement results, or some combination thereof, wherein the information indicates a list of beams, and the information is based on a trigger event, the measurement results, or some combination thereof.

19 Claims, 5 Drawing Sheets (56) References Cited

U.S. PATENT DOCUMENTS

| | | | |
|---|---|---|---|
| 2016/0353510 A1* | 12/2016 | Zhang | H04W 72/085 |
| 2017/0238216 A1* | 8/2017 | Damnjanovic | H04W 16/28 |
| | | | 455/427 |
| 2017/0318541 A1 | 11/2017 | Islam et al. | |
| 2017/0331577 A1* | 11/2017 | Parkvall | H04W 4/00 |
| 2017/0331670 A1* | 11/2017 | Parkvall | H04W 52/0229 |
| 2018/0097556 A1* | 4/2018 | Nagaraja | H04W 36/0085 |
| 2018/0109986 A1 | 4/2018 | Touboul et al. | |
| 2018/0302889 A1* | 10/2018 | Guo | H04B 7/088 |
| 2018/0324780 A1* | 11/2018 | Novlan | H04L 43/0811 |
| 2019/0098520 A1 | 3/2019 | Kim | |
| 2019/0104549 A1 | 4/2019 | Deng et al. | |
| 2019/0116012 A1 | 4/2019 | Nam et al. | |
| 2019/0182007 A1 | 6/2019 | Liu et al. | |
| 2019/0182093 A1 | 6/2019 | Jayawardene et al. | |
| 2019/0289573 A1 | 9/2019 | Hwang et al. | |
| 2020/0022126 A1 | 1/2020 | You et al. | |
| 2020/0029259 A1* | 1/2020 | Yiu | H04W 76/27 |
| 2020/0068484 A1* | 2/2020 | da Silva | H04W 24/10 |
| 2020/0178134 A1 | 6/2020 | Yang et al. | |
| 2020/0204433 A1 | 6/2020 | Nagaraja et al. | |
| 2020/0221323 A1 | 7/2020 | Xu et al. | |
| 2020/0228189 A1 | 7/2020 | Tang et al. | |
| 2020/0244337 A1 | 7/2020 | Yuan et al. | |
| 2020/0259545 A1 | 8/2020 | Bai et al. | |
| 2020/0329503 A1 | 10/2020 | Da Silva et al. | |
| 2020/0351955 A1 | 11/2020 | Jeon et al. | |
| 2020/0374960 A1 | 11/2020 | Deenoo et al. | |
| 2021/0014791 A1* | 1/2021 | Freda | H04L 5/0053 |
| 2021/0204346 A1* | 7/2021 | Ye | H04B 7/00 |
| 2021/0337497 A1* | 10/2021 | Siomina | H04J 11/0079 |

\* cited by examiner

INDICATING A BEAM SWITCH REQUEST

CROSS REFERENCE TO RELATED APPLICATIONS

This application is a continuation of application Ser. No. 16/611,130 filed on Nov. 5, 2019, which is hereby incorporated by reference in its entirety.

FIELD

The subject matter disclosed herein relates generally to wireless communications and more particularly relates to indicating a beam switch request

BACKGROUND

The following abbreviations are herewith defined, at least some of which are referred to within the following description: Third Generation Partnership Project ("3GPP"), Positive-Acknowledgment ("ACK"), Binary Phase Shift Keying ("BPSK"), Clear Channel Assessment ("CCA"), Cyclic Prefix ("CP"), Cyclical Redundancy Check ("CRC"), Channel State Information ("CSI"), Common Search Space ("CSS"), Discrete Fourier Transform Spread ("DFTS"), Downlink Control Information ("DCI"), Downlink ("DL"), Downlink Pilot Time Slot ("DwPTS"), Enhanced Clear Channel Assessment ("eCCA"), Enhanced Mobile Broadband ("eMBB"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Guard Period ("GP"), Hybrid Automatic Repeat Request ("HARQ"), Internet-of-Things ("IoT"), Licensed Assisted Access ("LAA"), Load Based Equipment ("LBE"), Listen-Before-Talk ("LBT"), Long Term Evolution ("LTE"), Multiple Access ("MA"), Modulation Coding Scheme ("MCS"), Machine Type Communication ("MTC"), Multiple Input Multiple Output ("MIMO"), Multi User Shared Access ("MUSA"), Narrowband ("NB"), Negative-Acknowledgment ("NACK") or ("NAK"), Next Generation Node B ("gNB"), Non-Orthogonal Multiple Access ("NOMA"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Resource Control ("RRC"), Random Access Procedure ("RACH"), Random Access Response ("RAR"), Radio Network Temporary Identifier ("RNTI"), Reference Signal ("RS"), Resource Spread Multiple Access ("RSMA"), Round Trip Time ("RTT"), Receive ("RX"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Signal-to-Interference-Plus-Noise Ratio ("SINR"), System Information Block ("SIB"), Transport Block ("TB"), Transport Block Size ("TB S"), Time-Division Duplex ("TDD"), Time Division Multiplex ("TDM"), Transmission Time Interval ("TTI"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NACK"). ACK means that a TB is correctly received while NACK (or NAK) means a TB is erroneously received.

In certain wireless communications networks, different beams may be used to transmit information. In some configurations, a beam being used may not be the best beam available for transmitting information.

BRIEF SUMMARY

Apparatuses for beam switching are disclosed. Methods and systems also perform the functions of the apparatus. In one embodiment, the apparatus includes a transmitter that transmits information indicating a beam switch request, measurement results, or some combination thereof, wherein the information indicates a list of beams, and the information is based on a trigger event, the measurement results, or some combination thereof.

In one embodiment, the transmitter transmits the information in response to the trigger event, the measurement results, or some combination thereof. In a further embodiment, the information includes a list of beam identifiers corresponding to the list of beams. In certain embodiments, the information includes measurement results corresponding to each beam identifier of the list of beam identifiers. In various embodiments, the list of beam identifiers includes a maximum number of beams configured by signaling. In some embodiments, beam identifiers corresponding to the list of beam identifiers are ordered in a decreasing order based on the measurement results.

In certain embodiments, each beam identifier of the list of beam identifiers includes a beam ID, synchronization signal block, time index indicator, or some combination thereof. In some embodiments, the beam switch request is transmitted by a medium access control control element. In various embodiments, the apparatus includes a processor that starts a timer in response to the transmitter transmitting the information.

In one embodiment, the apparatus includes a receiver, wherein, in response to the receiver receiving a response corresponding to the transmitted information after an expiration time of the timer, the transmitter transmits an indication of beam failure in an uplink resource. In certain embodiments, the uplink resource is configured by signaling. In some embodiments, the apparatus includes a processor that, in response to transmitting the information, monitors for a response corresponding to the transmitted information during a time window. In various embodiments, the time window is configured by signaling.

In some embodiments, in response to not receiving the response during the time window, the transmitter retransmits the information. In certain embodiments, the apparatus includes a receiver that receives a response corresponding to the transmitted information, wherein the response indicates a beam identifier selected from a list of beam identifiers, and the beam identifier corresponds to a beam of the list of beams. In various embodiments, the beam identifier includes a beam ID, synchronization signal block, time index indicator, beam index, or some combination thereof in the beam switch request. In one embodiment, a response is transmitted by downlink control information or a medium access control control element.

A method for beam switching, in one embodiment, includes transmitting information indicating a beam switch request, measurement results, or some combination thereof, wherein the information indicates a list of beams, and the information is based on a trigger event, the measurement results, or some combination thereof.

In one embodiment, an apparatus for beam switching includes a receiver that receives information indicating a beam switch request, measurement results, or some combination thereof, wherein the information indicates a list of beams, and the information is based on a trigger event, the measurement results, or some combination thereof.

In one embodiment, the receiver receives the information in response to the trigger event, the measurement results, or some combination thereof. In a further embodiment, the information includes a list of beam identifiers corresponding to the list of beams. In certain embodiments, the information includes measurement results corresponding to each beam identifier of the list of beam identifiers. In various embodiments, the list of beam identifiers includes a maximum number of beams configured by signaling. In some embodiments, beam identifiers corresponding to the list of beam identifiers are ordered in a decreasing order based on the measurement results.

In certain embodiments, each beam identifier of the list of beam identifiers includes a beam ID, synchronization signal block, time index indicator, or some combination thereof. In some embodiments, the beam switch request is transmitted by a medium access control control element. In various embodiments, the apparatus includes a transmitter that transmits a response corresponding to the transmitted information, wherein the response indicates a beam selected from the at least one beam.

In one embodiment, the apparatus includes a processor that selects a beam identifier from a list of beam identifiers, and the beam identifier corresponds to a beam of the list of beams. In certain embodiments, the beam identifier includes a beam ID, synchronization signal block, time index indicator, beam index, or some combination thereof in the beam switch request. In some embodiments, a response is transmitted by downlink control information or a medium access control control element.

A method for beam switching, in one embodiment, includes receiving information indicating a beam switch request, measurement results, or some combination thereof, wherein the information indicates a list of beams, and the information is based on a trigger event, the measurement results, or some combination thereof.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
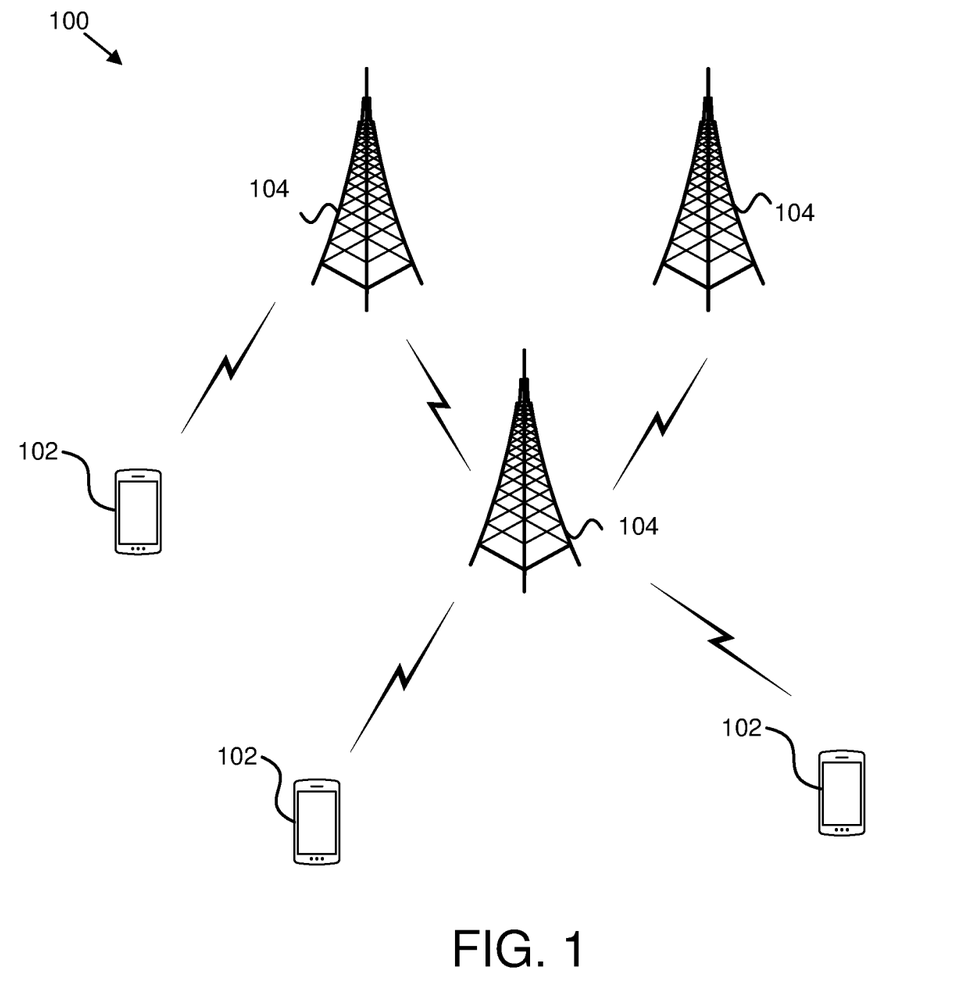
FIG. 1 is a schematic block diagram illustrating one embodiment of a wireless communication system for beam switching.

FIG. 1 depicts an embodiment of a wireless communication system 100 for beam switching. In one embodiment, the wireless communication system 100 includes remote units 102 and base units 104. Even though a specific number of remote units 102 and base units 104 are depicted in FIG. 1, one of skill in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the 3GPP protocol, wherein the base unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In one embodiment, a remote unit 102 may transmit information indicating a beam switch request, measurement results, or some combination thereof, wherein the information indicates a list of beams, and the information is based on a trigger event, the measurement results, or some combination thereof. Accordingly, a remote unit 102 may be used for beam switching.

In certain embodiments, a base unit 104 may receive information indicating a beam switch request, measurement results, or some combination thereof, wherein the information indicates a list of beams, and the information is based on a trigger event, the measurement results, or some combination thereof. Accordingly, a base unit 104 may be used for beam switching.

Figure 2:
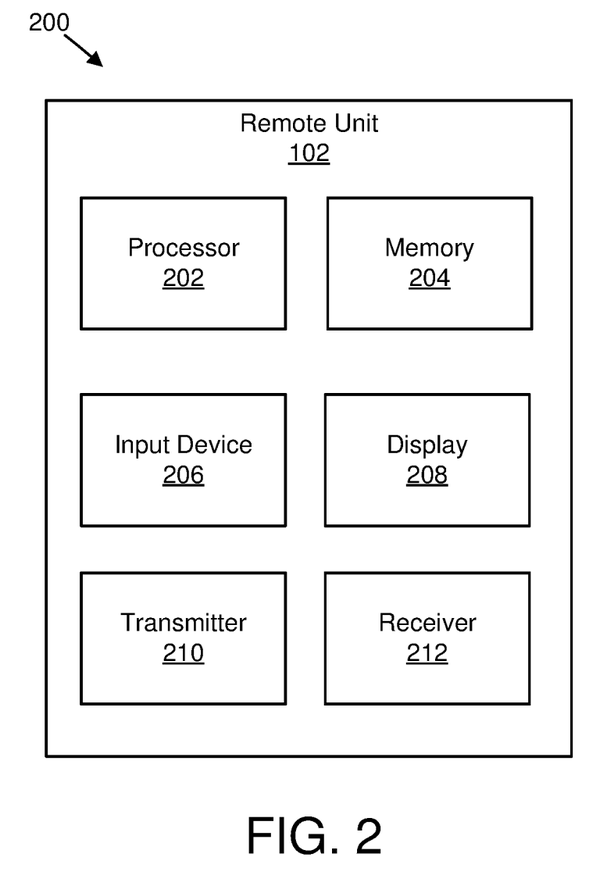
FIG. 2 is a schematic block diagram illustrating one embodiment of an apparatus that may be used for beam switching.

FIG. 2 depicts one embodiment of an apparatus 200 that may be used for beam switching. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to beam switching. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In certain embodiments, the transmitter 210 may be used to transmit information indicating a beam switch request, measurement results, or some combination thereof, wherein the information indicates a list of beams, and the information is based on a trigger event, the measurement results, or some combination thereof. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
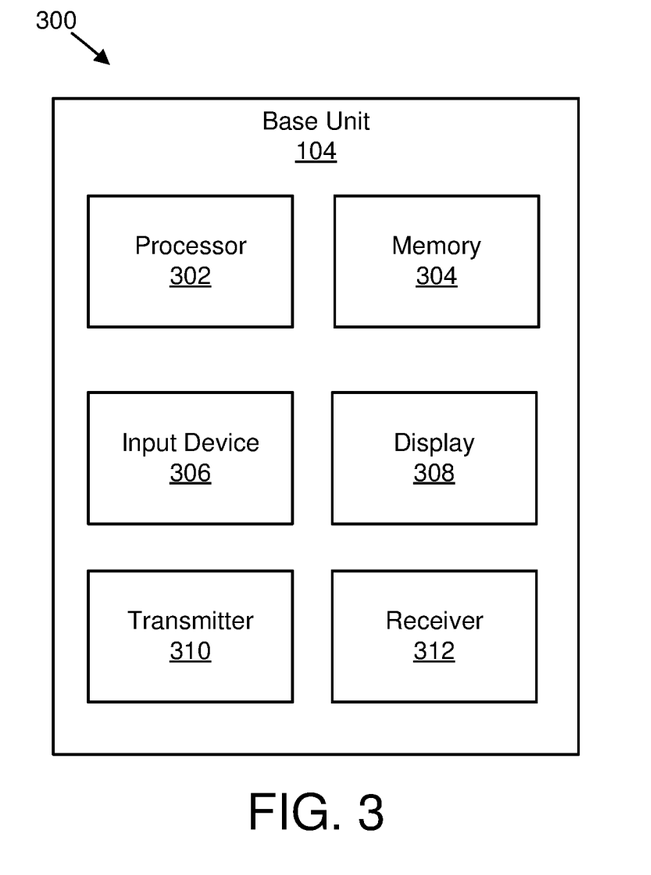
FIG. 3 is a schematic block diagram illustrating one embodiment of an apparatus that may be used for beam switching.

FIG. 3 depicts one embodiment of an apparatus 300 that may be used for beam switching. The apparatus 300 includes one embodiment of the base unit 104. Furthermore, the base unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the receiver 312 may be used to receive information indicating a beam switch request, measurement results, or some combination thereof, wherein the information indicates a list of beams, and the information is based on a trigger event, the measurement results, or some combination thereof. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In some embodiments, beam switching may be performed using various steps that may be performed in any suitable order.

In a first step, parameters may be configured by a base unit 104. In some embodiments, a trigger condition may be configured to perform beam measurement. In various embodiments, a serving beam may be worse than a configured threshold ("H1"). In certain embodiments, a trigger event ("E1") may be configured to trigger a remote unit 102 to transmit a beam switch request or report measurement result to a base unit 104. For example, a channel quality of a neighbor beam may be offset better than the serving beam. In one embodiment, this offset may be configured by a base unit 104. In some embodiments, a threshold ("H2") for channel quality, such as reference signal received power ("RSRP"), may be configured to determine whether a beam is suitable to switch or not. In various embodiments, a maximum number of beams ("M1") may be configured by a base unit 104 to determine the maximum number of beam included in a beam switch request or measurement report.

In a second step, a remote unit 102 may perform a measurement. In certain embodiments, in response to a channel quality of a serving beam being less than a configured threshold ("H1"), a remote unit 102 may be triggered to perform measurement for beams belonging to a serving cell or a set of beams ("S1") configured by a base unit 104.

In a third step, a remote unit 102 may transmit a beam switch request or report measurement result to a base unit 104. In certain embodiments, a remote unit 102 transmits a beam switch request to a base unit 104. In various embodiments, a beam switch request may include beam information, such as a list of suitable beam identifiers and/or measurement results. In some embodiments, a beam switch request may be transmitted by medium access control ("MAC") control elements ("CE"). In one embodiment, a maximum number of beams included in MAC CE may be restricted to a configuration from a base unit 104. Various possible options for MAC CE may exist. In various embodiments, an order for beams included in MAC CE may be associated to a decreasing order of measurement results. For example, a beam identifier 0 in the MAC CE may be the beam with the best channel quality. In some embodiments, a beam identifier may be a beam identification ("ID"), synchronization signal ("SS") block, time index indicator, beam index, or some combination thereof. In one embodiment, a size of a beam identifier may be 8 bits or another value. Table 1 illustrates an index that is implicitly indicated by MAC CE. For example, the index of beam identifier 0 is 0. Table 2 illustrates an index that is explicitly indicated by MAC CE. In some embodiments, a timer ("T1") may be started immediately after a remote unit 102 transmits a beam switch request. In some embodiments, an order for beams included in MAC CE is ordered based on a decreasing of measurement results as illustrated in Table 3.

TABLE 1

| Beam Identifier 0 |
|---|
| Beam Identifier 1 |
| Beam Identifier 2 |
| Beam Identifier 3 |

TABLE 2

| Beam Index | |
|---|---|
| 0 | Beam Identifier 0 |
| 1 | Beam Identifier 1 |
| 2 | Beam Identifier 2 |
| 3 | Beam Identifier 3 |

TABLE 3

| Beam Identifier 0 |
|---|
| Measurement Result of Beam Identifier 0 |
| Beam Identifier 1 |
| Measurement Result of Beam Identifier 1 |
| Beam Identifier 2 |
| Measurement Result of Beam Identifier 2 |

In a fourth step, a base unit 104 may transmit a response to a remote unit 102. In some embodiments, after receiving a beam switch request or measurement result report from a remote unit 102, a base unit 104 may select one beam included in a remote unit 102 report. In certain embodiments, a base unit 104 may transmit a beam switch command including a beam index to a remote unit 102 by DCI or MAC CE.

In a fifth step, a remote unit 102 may receive the response from the base unit 104. In certain embodiments, after transmitting the beam switch request or reporting measurement result, a remote unit 102 may monitor for a response within a time window, which may be configured by a base unit 104. In various embodiments, if no response is received within the time window, the remote unit 102 may be enabled to transmit a beam switch request again (e.g., retransmit). In one embodiment, a content of the request or measurement report may be changed based on a measurement result. In some embodiments, if a remote unit 102 does not receive a response from a base unit 104 after a timer ("T1") expires, the remote unit 102 may transmit an indication of beam failure to a base unit 104 in an UL resource that may be configured by the base unit 104.

In a sixth step, a remote unit 102 may switch to an RX beam corresponding to a selected TX beam. In certain embodiments, a base unit 104 may switch to a selected TX beam. In various embodiments, in response to a remote unit 102 receiving a response indicating a beam index from a base unit 104, the remote unit 102 may switch to an RX beam corresponding to an indicated beam index.

Figure 4:
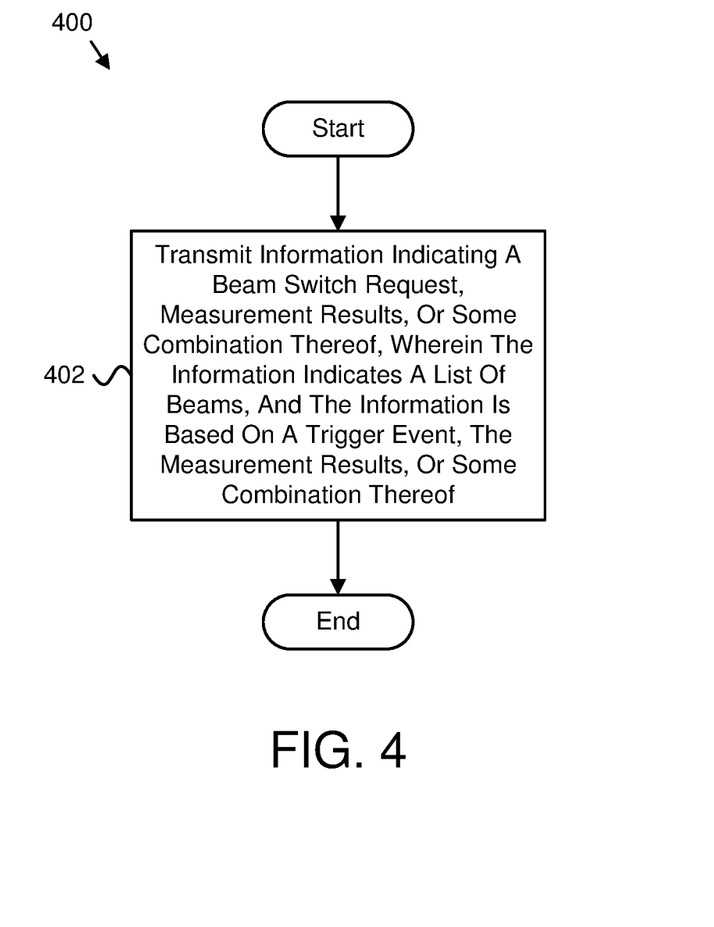
FIG. 4 is a schematic flow chart diagram illustrating one embodiment of a method for beam switching.

FIG. 4 is a schematic flow chart diagram illustrating one embodiment of a method 400 for beam switching. In some embodiments, the method 400 is performed by an apparatus, such as the remote unit 102. In certain embodiments, the method 400 may be performed by a processor executing program code, for example, a microcontroller, a microprocessor, a CPU, a GPU, an auxiliary processing unit, a FPGA, or the like.

The method 400 may include transmitting 402 information indicating a beam switch request, measurement results, or some combination thereof, wherein the information indicates a list of beams, and the information is based on a trigger event, the measurement results, or some combination thereof.

In one embodiment, the method 400 includes transmitting the information in response to the trigger event, the measurement results, or some combination thereof. In a further embodiment, the information includes a list of beam identifiers corresponding to the list of beams. In certain embodiments, the information includes measurement results corresponding to each beam identifier of the list of beam identifiers. In various embodiments, the list of beam identifiers includes a maximum number of beams configured by signaling. In some embodiments, beam identifiers corresponding to the list of beam identifiers are ordered in a decreasing order based on the measurement results.

In certain embodiments, each beam identifier of the list of beam identifiers includes a beam ID, synchronization signal block, time index indicator, or some combination thereof. In some embodiments, the beam switch request is transmitted by a medium access control control element. In various embodiments, the method 400 includes starting a timer in response to the transmitter transmitting the information.

In one embodiment, the method 400 includes transmitting, in response to receiving a response corresponding to the transmitted information after an expiration time of the timer, an indication of beam failure in an uplink resource. In certain embodiments, the uplink resource is configured by signaling. In some embodiments, the method 400 includes monitoring, in response to transmitting the information, for a response corresponding to the transmitted information during a time window. In various embodiments, the time window is configured by signaling.

In some embodiments, in response to not receiving the response during the time window, the method 400 includes retransmitting the information. In certain embodiments, the method 400 includes receiving a response corresponding to the transmitted information, wherein the response indicates a beam identifier selected from a list of beam identifiers, and the beam identifier corresponds to a beam of the list of beams. In various embodiments, the beam identifier includes a beam ID, synchronization signal block, time index indicator, beam index, or some combination thereof in the beam switch request. In one embodiment, a response is transmitted by downlink control information or a medium access control control element.

Figure 5:
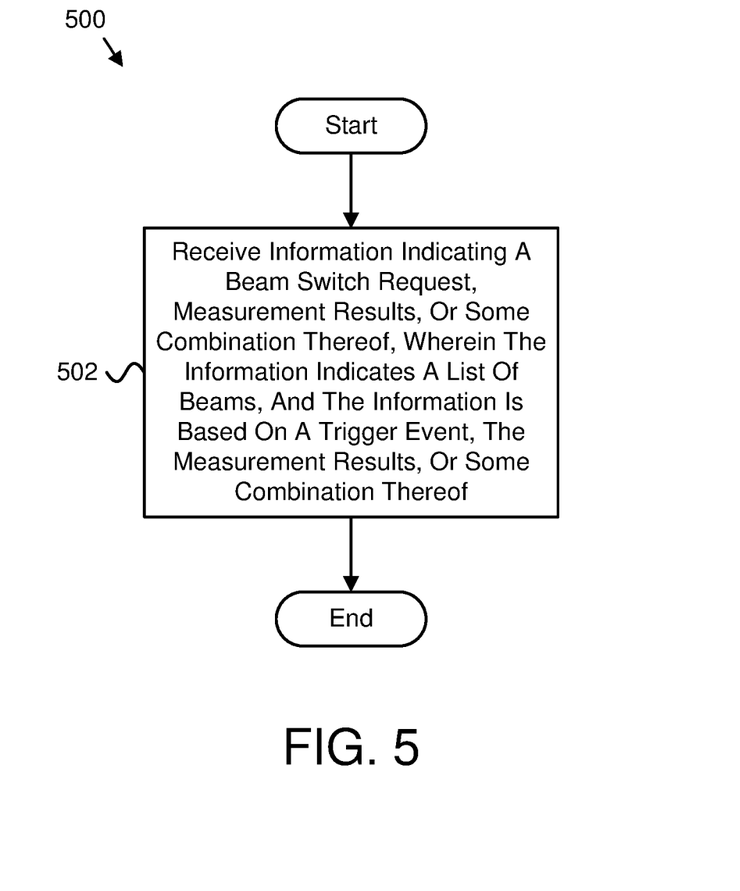
FIG. 5 is a schematic flow chart diagram illustrating another embodiment of a method for beam switching.

FIG. 5 is a schematic flow chart diagram illustrating another embodiment of a method 500 for beam switching. In some embodiments, the method 500 is performed by an apparatus, such as the base unit 104. In certain embodiments, the method 500 may be performed by a processor executing program code, for example, a microcontroller, a microprocessor, a CPU, a GPU, an auxiliary processing unit, a FPGA, or the like.

The method 500 may include receiving 502 information indicating a beam switch request, measurement results, or some combination thereof, wherein the information indicates a list of beams, and the information is based on a trigger event, the measurement results, or some combination thereof.

In one embodiment, the method 500 includes receiving the information in response to the trigger event, the measurement results, or some combination thereof. In a further embodiment, the information includes a list of beam identifiers corresponding to the list of beams. In certain embodiments, the information includes measurement results corresponding to each beam identifier of the list of beam identifiers. In various embodiments, the list of beam identifiers includes a maximum number of beams configured by signaling. In some embodiments, beam identifiers corresponding to the list of beam identifiers are ordered in a decreasing order based on the measurement results.

In certain embodiments, each beam identifier of the list of beam identifiers includes a beam ID, synchronization signal block, time index indicator, or some combination thereof. In some embodiments, the beam switch request is transmitted by a medium access control control element. In various embodiments, the method 500 includes transmitting a response corresponding to the transmitted information, wherein the response indicates a beam selected from the at least one beam.

In one embodiment, the method 500 includes selecting a beam identifier from a list of beam identifiers, and the beam identifier corresponds to a beam of the list of beams. In certain embodiments, the beam identifier includes a beam ID, synchronization signal block, time index indicator, beam index, or some combination thereof in the beam switch request. In some embodiments, a response is transmitted by downlink control information or a medium access control control element.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
    a transmitter that transmits information indicating a beam switch request, measurement results, or some combination thereof, wherein the information indicates a list of beams, and the information is based on a trigger event, the measurement results, or some combination thereof, wherein the information comprises a list of beam identifiers corresponding to the list of beams and the list of beam identifiers comprises a maximum number of beams configured by signaling; and
    a receiver that receives a beam switch command based on the information transmitted, wherein the beam switch command comprises an indication of a beam to switch to, wherein, in response to the receiver receiving a response corresponding to the transmitted information after an expiration time of a timer, the transmitter transmits an indication of beam failure in an uplink resource.

2. The apparatus of claim 1, wherein the transmitter transmits the information in response to the trigger event, the measurement results, or some combination thereof.

3. The apparatus of claim 1, wherein the information comprises measurement results corresponding to each beam identifier of the list of beam identifiers.

4. The apparatus of claim 1, wherein beam identifiers corresponding to the list of beam identifiers are ordered in a decreasing order based on the measurement results.

5. The apparatus of claim 1, wherein each beam identifier of the list of beam identifiers comprises a beam ID, synchronization signal block, time index indicator, or some combination thereof.

6. The apparatus of claim 1, wherein the beam switch request is transmitted by a medium access control control element.

7. The apparatus of claim 1, further comprising a processor that starts a timer in response to the transmitter transmitting the information.

8. The apparatus of claim 1, wherein the uplink resource is configured by signaling.

9. The apparatus of claim 1, further comprising a processor that, in response to transmitting the information, monitors for a response corresponding to the transmitted information during a time window.

10. The apparatus of claim 9, wherein the time window is configured by signaling.

11. The apparatus of claim 9, wherein, in response to not receiving the response during the time window, the transmitter retransmits the information.

12. The apparatus of claim 1, further comprising a receiver that receives a response corresponding to the transmitted information, wherein the response indicates a beam identifier selected from a list of beam identifiers, and the beam identifier corresponds to a beam of the list of beams.

13. The apparatus of claim 12, wherein the beam identifier comprises a beam ID, synchronization signal block, time index indicator, beam index, or some combination thereof in the beam switch request.

14. The apparatus of claim 1, wherein a response is transmitted by downlink control information or a medium access control control element.

15. A method comprising:
    transmitting information indicating a beam switch request, measurement results, or some combination thereof, wherein the information indicates a list of beams, and the information is based on a trigger event, the measurement results, or some combination thereof, wherein the information comprises a list of beam identifiers corresponding to the list of beams and the list of beam identifiers comprises a maximum number of beams configured by signaling; and
    receiving a beam switch command based on the information transmitted, wherein the beam switch command comprises an indication of a beam to switch to, wherein, in response to receiving a response corresponding to the transmitted information after an expiration time of a timer, an indication of beam failure is transmitted in an uplink resource.

16. An apparatus comprising:
    a receiver that receives information indicating a beam switch request, measurement results, or some combination thereof, wherein the information indicates a list of beams, and the information is based on a trigger event, the measurement results, or some combination thereof, wherein the information comprises a list of beam identifiers corresponding to the list of beams and the list of beam identifiers comprises a maximum number of beams configured by signaling; and
    a transmitter that transmits a beam switch command based on the information received, wherein the beam switch command comprises an indication of a beam to switch to, wherein, in response to the transmitter transmitting a response corresponding to the received information after an expiration time of a timer, the receiver receives an indication of beam failure in an uplink resource.

17. The apparatus of claim 16, wherein the receiver receives the information in response to the trigger event, the measurement results, or some combination thereof.

18. The apparatus of claim 16, wherein the information comprises measurement results corresponding to each beam identifier of the list of beam identifiers.

19. The apparatus of claim 16, further comprising a transmitter that transmits a response corresponding to the transmitted information, wherein the response indicates a beam selected from the at least one beam.

* * * * *